(12) United States Patent
Watanabe et al.

(10) Patent No.: US 9,098,886 B2
(45) Date of Patent: Aug. 4, 2015

(54) APPARATUS AND METHOD FOR PROCESSING AN IMAGE

(71) Applicant: KABUSHIKI KAISHA TOSHIBA, Tokyo (JP)

(72) Inventors: Wataru Watanabe, Kanagawa-ken (JP); Masahiro Baba, Kanagawa-ken (JP); Ryosuke Nonaka, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 43 days.

(21) Appl. No.: 13/963,643

(22) Filed: Aug. 9, 2013

(65) Prior Publication Data
US 2014/0099027 A1 Apr. 10, 2014

(30) Foreign Application Priority Data

Oct. 9, 2012 (JP) .................................. 2012-224520

(51) Int. Cl.
*G06K 9/00* (2006.01)
*G06T 5/00* (2006.01)
*H04N 1/60* (2006.01)
*H04N 9/77* (2006.01)

(52) U.S. Cl.
CPC . *G06T 5/00* (2013.01); *G06T 5/007* (2013.01); *H04N 1/60* (2013.01); *H04N 1/6027* (2013.01); *H04N 9/77* (2013.01); *G06T 2207/10004* (2013.01); *G06T 2207/10024* (2013.01); *G06T 2207/30201* (2013.01)

(58) Field of Classification Search
USPC .......................... 382/162, 164, 165, 167, 274
See application file for complete search history.

(56) References Cited

U.S. PATENT DOCUMENTS

| | | | |
|---|---|---|---|
| 5,917,541 A * | 6/1999 | Nakagome et al. | 348/93 |
| 6,639,594 B2 | 10/2003 | Zhang et al. | |
| 7,146,059 B1 | 12/2006 | Durand et al. | |
| 7,319,467 B2 | 1/2008 | Weyrich et al. | |
| 7,764,894 B2 * | 7/2010 | Tanaka | 399/68 |
| 7,853,082 B2 | 12/2010 | Shimano et al. | |

(Continued)

FOREIGN PATENT DOCUMENTS

| | | |
|---|---|---|
| JP | 05-266157 | 10/1993 |
| JP | 6-236440 | 8/1994 |

(Continued)

OTHER PUBLICATIONS

Umeyama et al., Separation of Diffuse and Specular Components of Surface Reflection by Use of Polarization and Statistical Analysis of Images, May 2004, IEEE Transactions on Pattern Analysis and Machine Intelligence, vol. 26, No. 5, pp. 639-647.

(Continued)

*Primary Examiner* — Yon Couso
(74) *Attorney, Agent, or Firm* — Nixon & Vanderhye, P.C.

(57) ABSTRACT

According to one embodiment, an image processing apparatus includes a chroma calculation unit, a lightness calculation unit, a glossiness calculation unit, and a correction unit. The chroma calculation unit is configured to calculate a chroma of each pixel of an image to be processed. The lightness calculation unit is configured to calculate a lightness of each pixel of the image. The glossiness calculation unit is configured to estimate a glossiness of each pixel of the image, based on the chroma and the lightness. The correction unit is configured to correct each pixel of the image so that a correction amount of a pixel is larger when the glossiness of the pixel is higher.

20 Claims, 7 Drawing Sheets

(56) References Cited

U.S. PATENT DOCUMENTS

| | | |
|---|---|---|
| 8,064,726 B1 | 11/2011 | d'Eon et al. |
| 8,457,389 B2 | 6/2013 | Ishiyama |
| 8,488,879 B2 | 7/2013 | Kobiki et al. |
| 8,538,183 B1 | 9/2013 | d'Eon et al. |
| 2006/0188157 A1* | 8/2006 | Kondo et al. .................. 382/167 |
| 2007/0065015 A1 | 3/2007 | Nishiyama et al. |
| 2007/0176941 A1 | 8/2007 | Maxwell et al. |
| 2008/0056605 A1* | 3/2008 | Shehata et al. ................. 382/274 |
| 2009/0226029 A1 | 9/2009 | Shimano et al. |
| 2011/0058200 A1* | 3/2011 | Miyahara et al. .............. 358/1.9 |
| 2011/0176728 A1 | 7/2011 | Matsuoka |
| 2011/0268350 A1 | 11/2011 | Tsukada |
| 2012/0051635 A1 | 3/2012 | Kunkel et al. |
| 2012/0183213 A1 | 7/2012 | Robles-Kelly et al. |
| 2013/0114911 A1 | 5/2013 | Smith |
| 2013/0201501 A1 | 8/2013 | Nishikawa et al. |
| 2013/0251288 A1 | 9/2013 | Kobiki et al. |

FOREIGN PATENT DOCUMENTS

| | | |
|---|---|---|
| JP | 2007-072814 | 3/2007 |
| JP | 2011-171807 | 9/2011 |

OTHER PUBLICATIONS

Maxwell et al., "A Bi-Illuminant Dichromatic Reflection Model for Understanding Images", Jun. 2008, IEEE Conference on Computer Vision and Pattern Recognition, pp. 1-8.

S.A. Shafer, "Using color to separate reflection components", *Technical Report of University of Rochester, Computer Science Department*, TR 136, 1984, 31 pgs.

Kobiki et al., U.S. Appl. No. 13/617,541, filed Sep. 14, 2012—non-final office action mailed Mar. 17, 2014.

* cited by examiner

APPARATUS AND METHOD FOR PROCESSING AN IMAGE

CROSS-REFERENCE TO RELATED APPLICATION

This application is based upon and claims the benefit of priority from Japanese Patent Application No. 2012-224520, filed on Oct. 9, 2012; the entire contents of which are incorporated herein by reference.

FIELD

Embodiments described herein relate generally to an apparatus and a method for controlling an apparent gloss and an apparent brightness of an input image.

BACKGROUND

Many techniques to change emphasis of feeling of material (especially, "apparent gloss" and "apparent shininess") of an object in an image by image processing are proposed. As to a first method of conventional technique, a model to link "sensitivity amount of high order" (such as a feeling of metallic material) with the image is trained, and the feeling of material is changed using the model trained. As to a second method of conventional technique, the image is separated into a diffused reflection image (color of the object itself) and a specular reflection image (color reflected from the object by illumination light). By adding the specular reflection image emphasized to the diffuse reflection image, an apparent gloss of the object in the image is emphasized.

However, in above-mentioned two methods, many computer resources are necessary to change the apparent gloss.

DETAILED DESCRIPTION

According to one embodiment, an image processing apparatus includes a chroma calculation unit, a lightness calculation unit, a glossiness calculation unit, and a correction unit. The chroma calculation unit is configured to calculate a chroma of each pixel of an image to be processed. The lightness calculation unit is configured to calculate a lightness of each pixel of the image. The glossiness calculation unit is configured to estimate a glossiness of each pixel of the image, based on the chroma and the lightness. The correction unit is configured to correct each pixel of the image so that a correction amount of a pixel is larger when the glossiness of the pixel is higher.

Various embodiments will be described hereinafter with reference to the accompanying drawings.

The First Embodiment

The first embodiment relates to an image processing apparatus to generate an image having an apparent gloss emphasized from an input image (target image). The input image includes a pixel value of each pixel. For example, the pixel value is an image having a luminance signal and a color difference signal based on standard of International Telecommunication Union (Hereinafter, it is called "ITU"). These signals may be based on any of a system to have RGB (three primary colors) components and a system to convert from RGB to the luminance signal and the color difference signal. In the first embodiment, as one example, the pixel value is represented as Y (luminance signal), Cb and Cr (color difference signal) converted by gamut-conversion method based on ITU-RBT.601 standard. Y, Cb and Cr are converted from RGB by following conversion method. Moreover, R is a signal value of luminance of red component, G is a signal value of luminance of green component, and B is a signal value of luminance of blue component.

$Y=219Y'+16$ $Cb=224Pb+128$ $Cr=224Pr+128$

Here, Y', Pb and Pr are as follows.

$Y'=0.299R+0.587G+0.114B$ $Pb=0.564(B-Y)$ $Pr=0.713(R-Y)$

Y, Cb and Cr include discrete values respectively. In the first embodiment, an example that Y, Cb and Cr are represented by eight bits respectively, will by explained. Moreover, the image may be a single image or sequential images.

Figure 1:
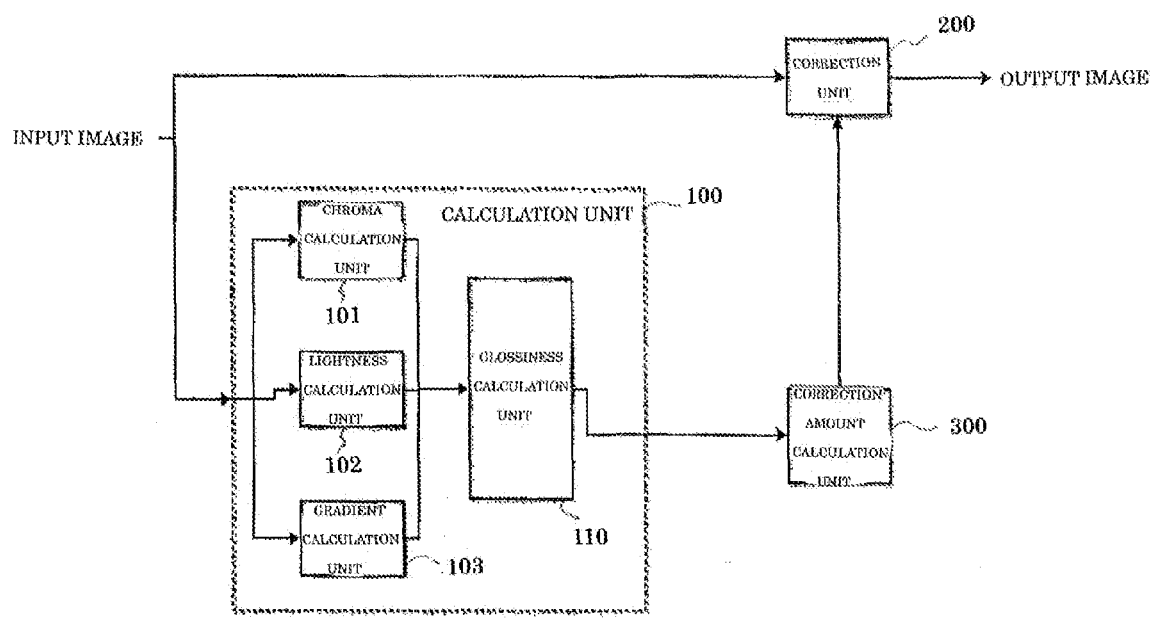
FIG. 1 is a block diagram of an image processing apparatus according to the first embodiment.

FIG. 1 is a block diagram of the image processing apparatus according to the first embodiment. The image processing apparatus includes a calculation unit 100, a correction unit 200, and a correction amount calculation unit 300. Furthermore, the calculation unit 100 includes a chroma calculation unit 101, a lightness calculation unit 102, a gradient calculation unit 103, and a glossiness calculation unit 110.

The calculation unit 100 calculates a glossiness from an input image. The glossiness is an evaluation value to evaluate how many components due to gloss are added to a pixel value of each pixel in the input image. In the first embodiment, if components due to gloss are more added, the glossiness becomes higher. The gloss is a phenomenon that, a surface of an object (subject) is brightened by reflecting a light thereon, or another image is included in the input image.

The chroma calculation unit 101 calculates a chroma from each pixel value of the input image. The chroma is a scale of vividness of color. The chroma is in proportion to a distance from a center axis (achromatic color axis) in a color space. If the distance is longer, a value of the chroma becomes larger.

The lightness calculation unit 102 calculates a lightness from each pixel in the input image. The lightness is a scale of brightness of color. If the pixel value is brighter, a value of the lightness becomes larger.

Hereinafter, an example to calculate the chroma and the lightness in HSV color space will be explained. However, the chroma and the lightness may be calculated in another color space. For example, the chroma and the lightness mat be values calculated using HLS or YCbCr.

The gradient calculation unit 103 calculates a gradient intensity by referring to a target pixel and other pixels (surrounding pixels) around the target pixel in the input image. The gradient intensity is an evaluation value representing an intensity of gradient of the target pixel. If the gradient is stronger, a value of the gradient intensity becomes larger. The gradient of the image represents a degree how much a pixel value of the target pixel is changed from pixel values of the surrounding pixels.

The glossiness calculation unit 110 calculates a glossiness of each pixel from the chroma, the lightness and the gradient intensity. In the first embodiment, the glossiness is calculated based on following assumptions.

(Assumption 1) As to a pixel of which chroma is lower and lightness is higher, a glossiness of the pixel is higher.

(Assumption 2) As to a pixel of which gradient intensity is low degree~middle degree, a glossiness of the pixel is higher.

A concrete method for calculating the gloss will be explained afterwards. The correction amount calculation unit 300 calculates a correction amount of a pixel value of each pixel according to the glossiness calculated.

Figure 3:
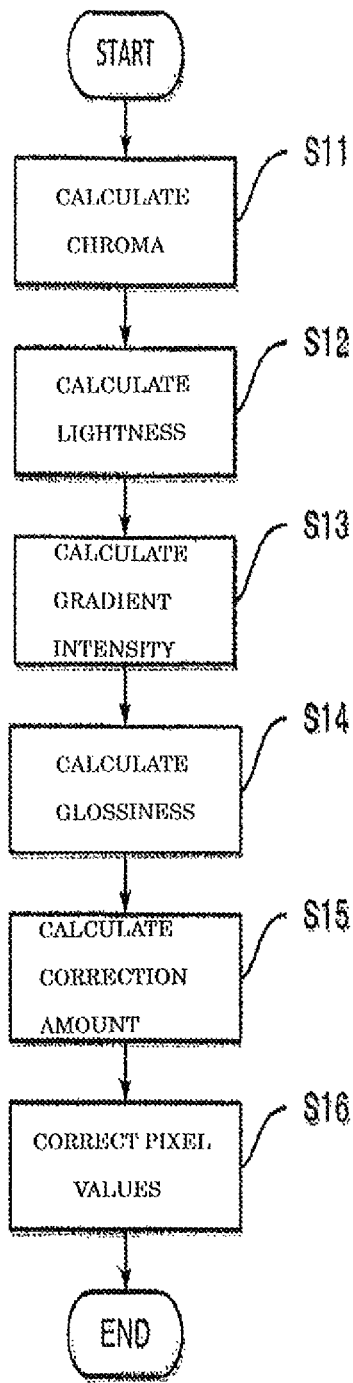
FIG. 3 is a flow chart of processing of the image processing apparatus according to the first embodiment.

Next, an operation of the image processing apparatus of the first embodiment will be explained. FIG. 3 is a flow chart of the image processing apparatus of the first embodiment.

The chroma calculation unit 101 calculates a chroma of each pixel of the image (S11). In the first embodiment, a component to calculate a chroma and a lightness represented by HSV color space is shown as an example. In HSV color space, the chroma S and the lightness V are calculated from signal values of RGB. YCbCr [BT.601] (0~255) as pixel values of the input image can be converted to pixel values of RGB(0.0~1.0) format based on an equation (1).

$$\begin{bmatrix} R \\ G \\ B \end{bmatrix} = \begin{bmatrix} 1.0 & 0.0 & 1.407 \\ 1.0 & -0.3441 & -0.7141 \\ 1.0 & 1.7220 & 0.0 \end{bmatrix} \begin{bmatrix} (Y-16)/219 \\ (Cb-128)/224 \\ (Cr-128)/224 \end{bmatrix} \quad (1)$$

Here, the chroma S(x,y) of a pixel at a coordinate (x,y) is calculated by an equation (2).

$$S(x,y)=(MAX_{(x,y)}(R,G,B)-MIN_{(x,y)}(R,G,B)/MAX_{(x,y)}(R,G,B) \quad (2)$$

Here, $MAX_{(x,y)}(R,G,B)$ is a maximum among pixel values of respective RGB channels of a pixel at a coordinate (x,y). $MIN_{(x,y)}(R,G,B)$ is a minimum among pixel values of respective RGB channels of a pixel at a coordinate (x,y).

The lightness calculation unit 102 calculates a lightness of each pixel value (S12). A lightness V(x,y) is calculated by an equation (3).

$$V(x,y)=MAX_{(x,y)}(R,G,B) \quad (3)$$

The gradient calculation unit 103 calculates a gradient intensity of a target pixel from pixel values of the target pixel and surrounding pixels thereof (S13). In the first embodiment, an example to calculate a gradient using a Roberts filter will be explained. The Roberts filter calculates a gradient dx along x-direction and a gradient dy along y-direction based on equations (4) and (5).

$$dx(x,y)=I(x,y)-I(x+1,y+1) \quad (4)$$

$$dy(x,y)=I(x+1,y)-I(x,y+1) \quad (5)$$

Here, I(x,y) represents a luminance (Y) of a pixel at a coordinate (x,y). In the equations (4) and (5), a gradient is calculated from a difference between a luminance of a target pixel at the coordinate (x,y) and a luminance of another pixel adjacent to the target pixel along x-direction or y-direction. A gradient intensity D (x,y) of the target pixel at the coordinate (x,y) is calculated by an equation (6).

$$D(x,y)=|dx(x,y)|+|dy(x,y)| \quad (6)$$

As a method for calculating the gradient, a Sobel filter or a difference between a maximum and a minimum of pixel values of surrounding pixels may be used.

Furthermore, a gradient of not luminance I(x,y) but lightness V(x,y) may be used. Furthermore, a gradient of a value digitizing (Assumption 1) or a whiteness degree f1(x,y) may be calculated. Furthermore, these gradients may be combined.

A glossiness F(x,y) as an evaluation value to digitize assumption related to gloss of each pixel is calculated (S14). In the first embodiment, the glossiness calculation unit 110 digitizes (Assumption 1) by an equation (7), and the digitized value is represented as $f_1(x,y)$.

$$f_1(x,y)=(1.0-S(x,y)) \cdot V(x,y) \quad (7)$$

The chroma S(x,y) and the lightness V(x,y) are normalized to a segment (0.0~1.0) respectively. Value range of $f_1(x,y)$ is (0.0~1.0). If the chroma S(x,y) is nearer to 0.0 and if the lightness V(x,y) is nearer to 1.0, $f_1(x,y)$ becomes higher. At a pixel having white approximately, $f_1(x,y)$ is high. Accordingly, $f_1(x,y)$ is called a whiteness degree. Here, by expanding the right side of the equation (7), $f_1(x,y)$ is defined as "$f_1(x,y)=MIN_{(x,y)}(R,G,B)$". By using minimum of RGB, the whiteness degree $f_1(x,y)$ can be calculated. Accordingly, calculation cost thereof can be reduced.

When $f_1(x,y)$ is calculated, as shown on an equation (8), a function $g_1$ for adjustment may be used.

$$f_1(x,y)=g_1((1.0-S(x,y)) \cdot V(x,y)) \quad (8)$$

Figure 4:
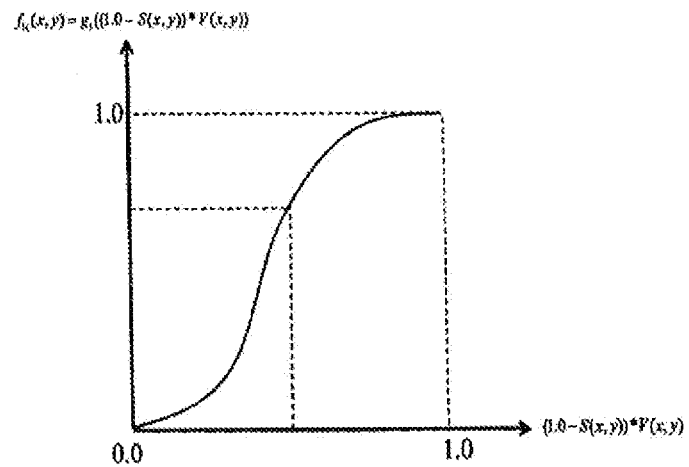
FIG. 4 is a schematic diagram to explain a function to change a response of parameter.

FIG. 4 shows an example of the function $g_1$. By using the function $g_1$ having a response shown in FIG. 4, $f_1(x,y)$ may be calculated. By changing the response using the function for adjustment, adjustment between the whiteness degree and an emphasis amount can be performed. For example, by selectively emphasizing pixels of which whiteness degree is high, unnecessary change of pixels of which whiteness degree is low can be prevented.

Furthermore, the glossiness calculation unit 110 calculates a glossiness based on (Assumption 2) by an equation (9)

$$f_2(x,y)=g_2(D) \quad (9)$$

In the equation (9), a gradient intensity D(x,y) is normalized to a segment (0.0~1.0). Here, if the gradient intensity of a pixel is nearer to a specific value, the function $g_2$ assigns a larger weight to the pixel. By setting the specific value to a value of low degree~middle degree, a glossiness $f_2$ based on (assumption 2) can be calculated. In this case, $f_2(x,y)$ is noted as an equation (10).

$$f_2(x,y)=\exp(-0.5 \cdot (D-\mu_{g2})/\sigma^2_{g2}) \quad (10)$$

In the equation (10), $\mu_{g2}$ and $\sigma^2_{g2}$ are parameters for adjustment. Specifically, $\mu_{g2}$ can adjust an average of gradient intensity to be weighted, and $\sigma^2_{g2}$ can adjust range of the weight. If the gradient intensity D of a target pixel is nearer to $\mu_{g2}$, $f_2(x,y)$ thereof is larger.

The glossiness calculation unit 110 calculates a glossiness $F(x,y)$ from $f_1(x,y)$ and $f_2(x,y)$ by an equation (11).

$$F(x,y)=f_1(x,y) \cdot f_2(x,y) \quad (11)$$

The correction amount calculation unit 300 calculates a correction amount of a pixel value of the target pixel based on the glossiness $F(x,y)$ (S15). In the first embodiment, a component to calculate a correction amount based on the glossiness and to emphasize a gloss by adding the correction amount to an input luminance signal (Y in YCbCr) will be explained as an example. The first embodiment is not limited to this component. For example, a component to calculate a correction amount by constantly multiplying the luminance signal based on the glossiness may be used. Furthermore, not only a component to emphasize the gloss but also a component to suppress the gloss may be used. In the first embodiment, the correction amount is defined as "$\gamma \times F(x,y) \times Y_{max}$". Here, $Y_{max}$ is a maximum of the luminance signal value. In case of YCbCr [BT.609] (eight bits), $Y_{max}$ is "235". Furthermore, $\gamma$ is a gain parameter to adjust the correction amount.

The correction unit 200 corrects pixel values according to the correction amount (S16). A luminance signal value Y' of which gloss is emphasized based on the correction amount is calculated according to an equation (12).

$$Y'(x,y)=Y(x,y)+\gamma \cdot F(x,y) \cdot Y_{max} \quad (12)$$

Figure 5:
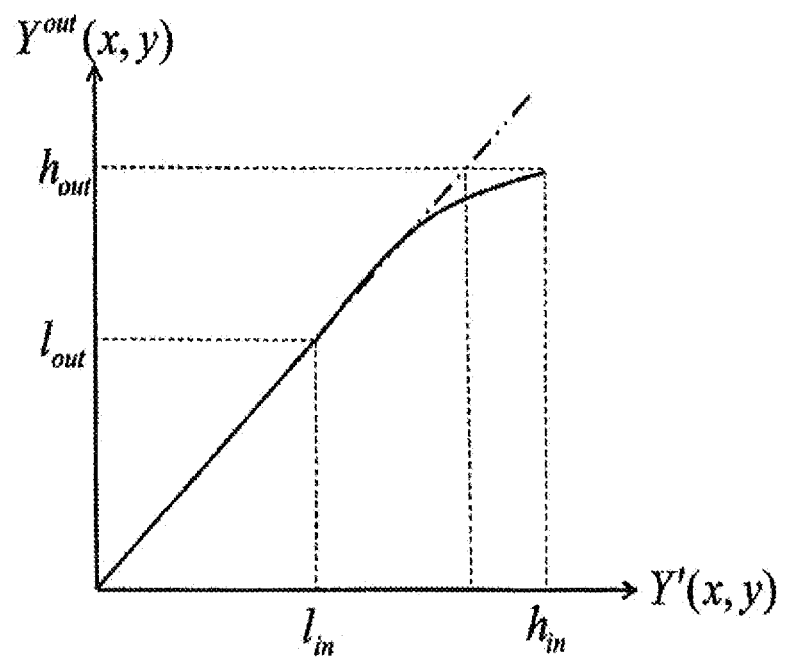
FIG. 5 is a schematic diagram to explain a function to compensate gradation.

Moreover, in the first embodiment, in order to prevent a gradation of luminance from saturating at a bright part, by calculating $Y^{out}(x,y)$ using a function of order 0.5 shown in FIG. 5, a gradation of an output image is compensated. By indicating two points $(l_{in}, l_{out})$ and $(h_{in}, h_{out})$ as shown in FIG. 5, a luminance signal $Y^{out}(x,y)$ of which gradation is compensated is calculated by an equation (12).

$$Y^{out}(x,y)=a \cdot \sqrt{Y'(x,y)}+b$$

$$a=(h_{out}-l_{out})/\sqrt{h_{in}}-\sqrt{l_{in}})$$

$$b=h_{out}-a \cdot \sqrt{h_{in}} \quad (13)$$

Above-mentioned compensation method is one example, and different component may be used. By emphasizing a luminance of pixel value having high glossiness, the gradation is often lost, i.e., saturation is occurred at a pixel having high luminance. However, in the first embodiment, the saturation can be corrected. Moreover, a component to compensate the gradation is not always necessary. A component not to compensate the gradation may be used.

In above explanation, an example to correct the luminance signal is already explained. However, a color difference signal may be corrected based on the purpose. Examples of correct equation of CbCr are shown as equations (14) and (15).

$$Cb'(x,y)=Cb(x,y)+(Cb(x,y)-128) \times (Y'(x,y)-Y(x,y)) \times (Y_{max}-Y(x,y)) \times \lambda \quad (15)$$

$$Cr'(x,y)=Cr(x,y)+(Cr(x,y)-128) \times (Y'(x,y)-Y(x,y)) \times (Y_{max}-Y(x,y)) \times \lambda \quad (16)$$

The second term of the right side is a correction amount. Furthermore, $\lambda$ is a parameter to adjust increase/decrease amount of color difference. By increasing/decreasing CbCr value according to equations (14) and (15), the gloss can be emphasized while vividness of pixel having high chroma is maintained in the input image.

By above-mentioned operation, processing of one pixel is completed. Processing of S11~S16 is repeated for all pixels in the input image.

Figure 2:
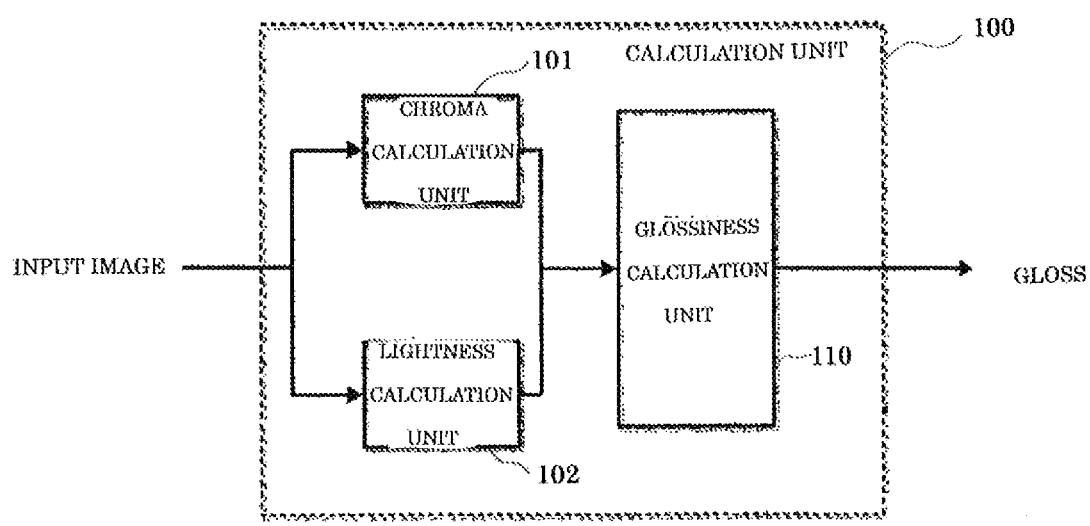
FIG. 2 is a block diagram of the image processing apparatus according to a modification of the first embodiment.

FIG. 2 is a block diagram of modification of the calculation unit 100 of the first embodiment. The calculation unit 100 shown in FIG. 1 is replaced with the calculation unit 100 shown in FIG. 2. In this modification, a glossiness calculation unit 110 calculates the glossiness from the chroma and the lightness. In this case, by using (Assumption 1), "$F(x,y)=f_1(x,y)$" is used.

Recently, a hardware for image processing is installed onto digital products such as a television or a digital camera. However, in case of general digital product, computer resources of this hardware are not abundant, and image processing technique to obtain high effect from few calculation loads is necessary. When a gloss of an object in an image is changed by a method disclosed in JP-A (Kokai) 2011-171807, by detecting a region of the object from the image, a change amount of image characteristic such as chroma needs to be calculated based on a model trained. Furthermore, when a gloss of an object in an image is changed by a method disclosed in JP-A (Kokai) H06-236440, in order to separate each component from the image, a wide region in the image needs to be repeatedly referred.

According to the first embodiment, by using image characteristic (such as chroma, lightness, gradient intensity) simply computable, an image of which gloss is controlled can be generated.

The Second Embodiment

Figure 6:
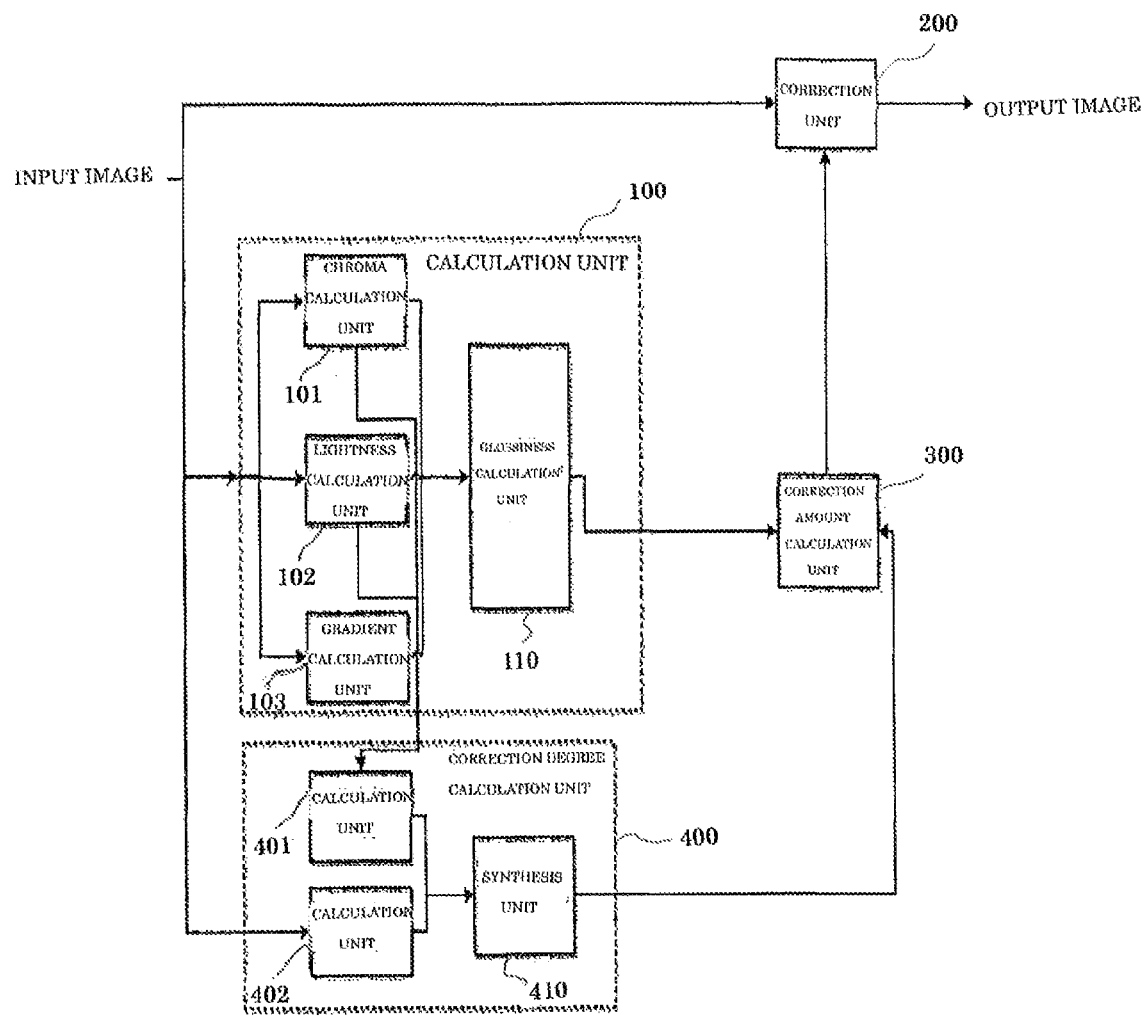
FIG. 6 is a block diagram of the image processing apparatus according to the second embodiment.

FIG. 6 is a block diagram of an image processing apparatus according to the second embodiment. As to the second embodiment, in comparison with the first embodiment, a correction degree calculation unit 400 is further included. The correction degree calculation unit 400 includes a calculation unit 401, a calculation unit 402, and a synthesis unit 410.

The correction degree calculation unit 400 calculates a correction degree to suppress the glossiness. This correction degree is used to adjust appearance of the output image. The calculation unit 401 calculates a correction degree to suppress the correction amount of glossiness by referring to the whiteness degree of entire image. The calculation unit 402 calculates a correction degree to suppress the correction amount of glossiness by detecting pixels having skin-color. The synthesis unit 410 calculates a correction degree by synthesizing respective correction degrees calculated by the calculation unit 401 and the calculation unit 402.

Next, operation of the image processing apparatus of the second embodiment will be explained. Here, a component having the calculation unit 401 and the calculation unit 402 will be explained. However, the second embodiment is not limited to this component. For example, by targeting maintenance of readability of characters, a correction degree to suppress the correction amount of glossiness of character regions in the image may be calculated.

Figure 7:
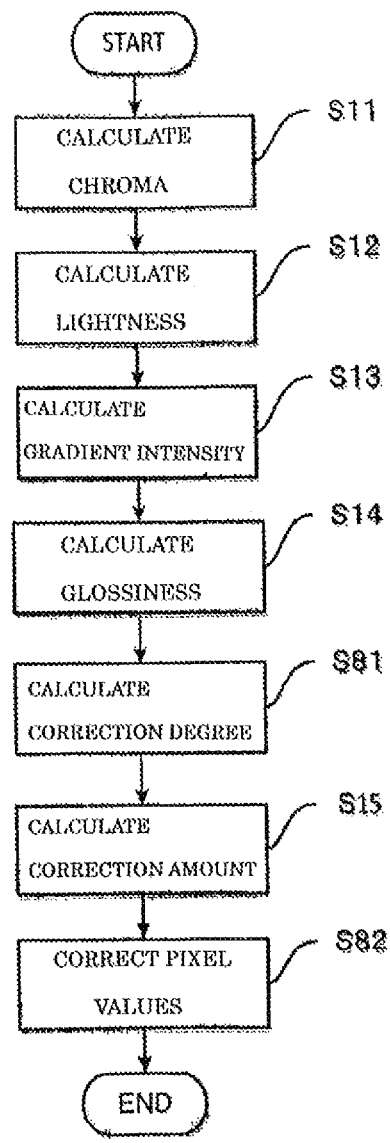
FIG. 7 is a flow chart of the image processing apparatus according to the second embodiment.

FIG. 7 is a flow chart of the image processing apparatus of the second embodiment. In comparison with the flow chart of FIG. 3, a first point that the correction degree calculation unit 400 calculates a correction degree (S81), and a second point that the correction unit 200 performs conversion based on the correction degree (S82) are different. Hereinafter, these different points will be explained.

The calculation unit 410 calculates a correction degree to suppress the correction amount from the whiteness degree of entire image. In general, a gloss region (a region reflected by a light) partially occurs on a surface of the object. Accordingly, when an image including an object having apparent of gloss is inputted, the number of pixels having high whiteness degree is reduced in comparison with the number of all pixels in the image. On the other hand, when many pixels have high whiteness degree, the case such as "the object is very strongly illuminated" or "a white object occupies in entire image" can be supposed. In such case, processing to emphasize gloss is often unnecessary.

In the second embodiment, by using an average of whiteness degree $f_1(x,y)$ of entire image, the calculation unit 401 calculates a correction degree $c_1$ to suppress the correction amount by an equation (16).

$$c_1 = \left(1.0 - \frac{1}{w*h}\sum_{y=1}^{h}\sum_{x=1}^{w} f_1(x, y)\right) \quad (16)$$

Here, w is the number of pixels along a lateral direction on the input image, and h is the number of pixels along a vertical direction on the image. Value range of $c_1$ is (0.0~1.0). If all pixels have high whiteness degree, $c_1$ is near to 0.0.

Figure 8:
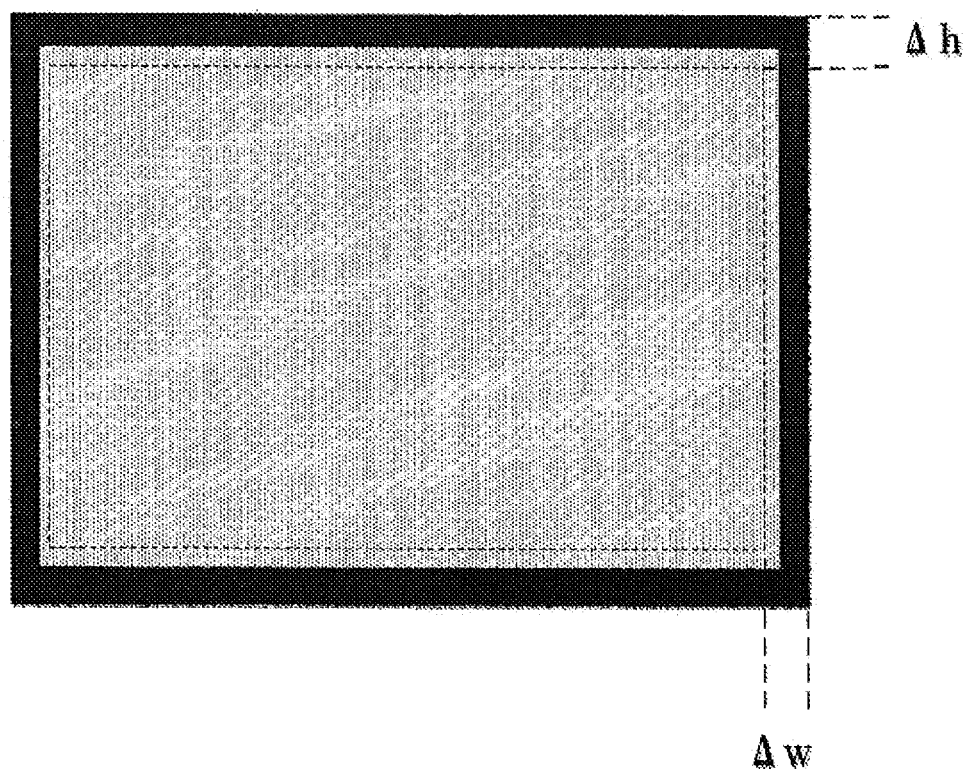
FIG. 8 is a schematic diagram to explain a reference range to calculate an average.

When the average is calculated, a region not to be referred may be set onto the image. As shown in FIG. 8, assume that respective regions having width $\Delta w$ or width $\Delta h$ are not referred. The correction degree $c_1$ is calculated by an equation (17).

$$c_1 = \left(1.0 - \frac{1}{(w-\Delta w)*(h-\Delta h)}\sum_{y=1+\Delta h}^{h-\Delta h}\sum_{x=1+\Delta w}^{w-\Delta w} f_1(x, y)\right) \quad (17)$$

A function to adjust a reference region is especially useful for broadcast wave. In case of the broadcast wave, a black frame (called "letter box" or "side panel") to adjust aspect ratio is often displayed. In above-mentioned case, by adjusting the reference region, as to existence/non-existence of black frame, correction can be stably performed. As $\Delta w$ and $\Delta h$, suitable values are previously calculated. Alternatively, these values may be estimated from the image.

Here, the case that sequential images are inputted is thought about. By using an image corresponding to time t, a correction degree to correct the correction amount of an image corresponding to time (t+1) (or (t+2) . . . ) is calculated. Similarly, in order to correct the correction amount of the image corresponding to time t, a memory to store information of one image is necessary. If such memory having large capacity is not utilized, a correction degree $c_1$ is calculated using an image corresponding to time (t−1) (in the past). Furthermore, a filter to smooth a response of $c_1$ along time direction may be used. In the second embodiment, in case of the sequential images, the correction degree corresponding to time t is calculated by an equation (18).

$$c_1^t = (1.0 - \beta) \cdot c_1^{t-1} + \quad (18)$$
$$\beta \cdot \left(1.0 - \frac{1}{(w-\Delta w)*(h-\Delta h)}\sum_{y=1+\Delta h}^{h-\Delta h}\sum_{x=1+\Delta w}^{w-\Delta w} f_1^{t-1}(x, y)\right)$$

Here, $c_1^{t-1}$ is a correction amount corresponding to time (t−1), and $f_1^{t-1}(x,y)$ is a whiteness degree of an image corresponding to time (t−1). Furthermore, β is a parameter to adjust speed that changes a value of $c_1$. If β is nearer to 0.0, the value of $c_1$ is changed more slowly. On the other hand, if β is equal to 1.0, an image corresponding to time (t−1) is only referred, and the value of $c_1$ is changed more rapidly.

The calculation unit 402 detects pixels having skin-color, and calculates a correction degree to suppress the correction amount. In case of the object such as a person's face, for example, feeling of oily skin is emphasized, i.e., the gloss emphasis effect is undesired as appearance. Accordingly, a function to suppress the gloss emphasis effect for skin-color region is useful practically. In the second embodiment, "probability that some pixel has skin-color" is defined as a skin-color probability $f_{skin}(x,y)$. A correction degree $C_2(x,y)$ to correct the correction amount of pixels having high skin-color probability is calculated.

In the second embodiment, signal values of input Cb and Cr are noticed. If Cb and Cr of general skin-color are in conformity with the normal distribution, a probability $P_{skin}(x,y)$ that some pixel has skin-color is calculated by an equation (19).

$$P_{skin}(x, y) = \frac{1}{Z}\exp\left(-0.5 \cdot (Col(x, y) - \mu)^T \sum^{-1} (Col(x, y) - \mu)\right) \quad (19)$$

In the equation (19), Col(x,y) is defined as Col(x,y)=(Cb(x,y),Cr(x,y))$^T$. Furthermore, μ and ρ are an average vector and a variance-covariance matrix of Cb and Cr of skin-color respectively. Furthermore, Z is a normalized constant. By preparing a large number of image data including skin and by taking the statistics thereof, μ and Σ can be estimated. Furthermore, if knowledge related to parameters is already acquired, this knowledge may be reflected thereto. In this case, in the second embodiment, a skin-color probability $f_{skin}(x,y)$ is defined as an equation (20).

$$f_{skin}(x,y) = \exp(-0.5 \cdot (Col(x,y) - \mu)^T \Sigma^{-1}(Col(x,y) - \mu)) \quad (20)$$

In the equation (20), value range of $f_{skin}(x,y)$ is (0.0~1.0). If $f_{skin}(x,y)$ is nearer to 1.0, a probability that the pixel has skin-color is higher.

From the above, a correction degree $C_2(x,y)$ is calculated by an equation (21).

$$c_2(x,y) = 1.0 - f_{skin}(x,y) \quad (21)$$

In the second embodiment, as to distribution of skin-color, Cb and Cr are noticed. However, the distribution of skin-color is not limited thereto. For example, distribution including Y-value may be estimated, or another color-expression may be used. Furthermore, in the second embodiment, skin-color probability is calculated using Gaussian distribution. However, the skin-color probability may be calculated by a discriminator such as support-vector machine.

Based on the correction degree calculated, the synthesis unit 310 calculates a correction degree C(x,y) of each pixel (to be used by the correction amount calculation unit 300). In the second embodiment, the correction degree C(x,y) is calculated by a following equation.

$$C(x,y) = C_1(x,y) \times C_2(x,y)$$

Furthermore, as shown in an equation (22), a function to increase/degrease a response of each correction degree in a range between 0.0~1.0 may be utilized.

$$C(x,y) = g_{c1}(c_1) * g_{c2}(c_2(x,y)) \quad (22)$$

In the second embodiment, by adding the correction degree C(x,y), the correction unit 200 calculates a luminance signal Y'(x,y) after emphasizing, and calculates a luminance signal $Y^{out}(x,y)$ after compensating gradation. Here, following equations are used.

$$Y'(x,y)=Y(x,y)+\gamma*F(x,y)*C(x,y)*Y_{max} \quad (23)$$

$$Y^{out}(x,y)=C(x,y)(a\cdot\sqrt{Y'(x,y)}+b)+(1.0-C(x,y))\cdot Y(x,y) \quad (24)$$

Operation of the equation will be explained. For example, as to pixels having high skin-color probability, the correction degree C(x,y) is approximated to 0.0. Accordingly, if a correction amount is calculated based on the equation (23), effect to selectively weaken the correction amount of skin region is expected. Furthermore, the equation (24) is noticed. When the correction degree is near 1.0, a correction amount to be added to the luminance signal is large. In this case, the correction amount is compensated by rounding a gradation according to the equation (24). On the other hand, when the correction degree is near 0.0, a correction amount to be added to the luminance signal is small. Accordingly, by outputting a value near the input signal, unnecessary gradation-change is prevented.

According to the second embodiment, by using image characteristic (such as chroma, lightness, gradient intensity) simply computable, an image of which gloss is emphasized can be generated. Furthermore, by suppressing the correction amount based on whiteness degree or skin-color probability, final appearance of the image can be corrected.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for processing an image, comprising:
  a chroma calculation unit configured to calculate a chroma of each pixel of an image to be processed;
  a lightness calculation unit configured to calculate a lightness of each pixel of the image;
  a glossiness calculation unit configured to estimate a glossiness of each pixel of the image, based on the chroma and the lightness; and
  a correction unit configured to correct each pixel of the image so that a correction amount of a pixel is larger when the glossiness of the pixel is higher.

2. The apparatus according to claim 1, wherein the glossiness calculation unit calculates the glossiness as a higher value when the chroma is lower or when the lightness is higher.

3. The apparatus according to claim 2, further comprising:
  a gradient calculation unit configured to calculate a gradient intensity from pixel values of the pixel and other pixels surrounding the pixel;
  wherein the glossiness calculation unit calculates the glossiness from the chroma, the lightness, and the gradient intensity.

4. The apparatus according to claim 3, wherein
  the glossiness calculation unit calculates the glossiness as a higher value when the gradient intensity is nearer to a specific value.

5. The apparatus according to claim 1, further comprising:
  a correction degree calculation unit configured to calculate an average of a whiteness degree from the chroma and the lightness of all pixels of the image, and to calculate a correction degree so that the correction amount is larger when the average of the whiteness degree is larger.

6. The apparatus according to claim 1, further comprising:
  a correction degree calculation unit configured to calculate a skin-color probability from a pixel value of the pixel, and to calculate a correction degree so that the correction amount is smaller when the skin-color probability is larger.

7. The apparatus according to claim 1, wherein
  the correction unit detects a character region from the image, and calculates a correction degree so that an emphasis amount of gloss is suppressed at the character region.

8. The apparatus according to claim 1, wherein
  the correction unit calculates a skin-color probability from the image, and calculates a correction degree so that an emphasis amount of gloss is more suppressed when the skin-color probability is larger.

9. The apparatus according to claim 1, further comprising:
  an input unit configured to input a parameter to adjust the correction amount;
  wherein the correction unit calculates the correction amount based on the parameter.

10. A method for processing an image, comprising:
  calculating, by a computer, a chroma of each pixel of an image to be processed;
  calculating, by the computer, a lightness of each pixel of the image;
  estimating, by the computer, a glossiness of each pixel of the image, based on the chroma and the lightness; and
  correcting, by the computer, each pixel of the image so that a correction amount of a pixel is larger when the glossiness of the pixel is higher.

11. The method according to claim 10, wherein
  the estimating comprises
    calculating the glossiness as a higher value when the chroma is lower or when the lightness is higher.

12. The method according to claim 11, further comprising:
  calculating, by the computer, a gradient intensity from pixel values of the pixel and other pixels surrounding the pixel;
  wherein the estimating comprises
    calculating the glossiness from the chroma, the lightness, and the gradient intensity.

13. The method according to claim 12, wherein
  the estimating comprises
    calculating the glossiness as a higher value when the gradient intensity is nearer to a specific value.

14. The method according to claim 10, further comprising:
  calculating, by the computer, an average of a whiteness degree from the chroma and the lightness of all pixels of the image; and
  calculating, by the computer, a correction degree so that the correction amount is larger when the average of the whiteness degree is larger.

15. The method according to claim 10, further comprising:
  calculating, by the computer, a skin-color probability from a pixel value of the pixel; and
  calculating, by the computer, a correction degree so that the correction amount is smaller when the skin-color probability is larger.

16. The method according to claim 10, wherein
  the correcting comprises
    detecting a character region from the image; and
    calculating a correction degree so that an emphasis amount of gloss is suppressed at the character region.

17. The method according to claim 10, wherein
the correcting comprises
  calculating a skin-color probability from the image; and
  calculating a correction degree so that an emphasis amount of gloss is more suppressed when the skin-color probability is larger.

18. The method according to claim 10, further comprising:
receiving, by the computer, a parameter to adjust the correction amount;
wherein the correcting comprises
  calculating the correction amount based on the parameter.

19. The apparatus according to claim 1, wherein
the glossiness calculation unit calculates the glossiness as a higher value when the chroma is lower and when the lightness is higher.

20. The method according to claim 10, wherein
the estimating comprises
  calculating the glossiness as a higher value when the chroma is lower and when the lightness is higher.

\* \* \* \* \*